United States Patent
Maruoka et al.

(10) Patent No.: US 9,254,467 B2
(45) Date of Patent: *Feb. 9, 2016

(54) OIL REPELLENCY-IMPARTED AIR-PERMEABLE FILTER WITH ADHESIVE LAYER

(71) Applicant: NITTO DENKO CORPORATION, Ibaraki-shi, Osaka (JP)

(72) Inventors: Nobuaki Maruoka, Osaka (JP); Yoshiki Ikeyama, Osaka (JP); Ryota Masuda, Osaka (JP); Asuka Onohara, Osaka (JP)

(73) Assignee: Nitto Denko Corporation, Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/390,953

(22) PCT Filed: Apr. 2, 2013

(86) PCT No.: PCT/JP2013/002291
§ 371 (c)(1),
(2) Date: Oct. 6, 2014

(87) PCT Pub. No.: WO2013/150782
PCT Pub. Date: Oct. 10, 2013

(65) Prior Publication Data
US 2015/0082984 A1 Mar. 26, 2015

(30) Foreign Application Priority Data
Apr. 6, 2012 (JP) .................. 2012-087049

(51) Int. Cl.
*B01D 53/22* (2006.01)
*B01D 71/40* (2006.01)
(Continued)

(52) U.S. Cl.
CPC .............. *B01D 71/40* (2013.01); *B01D 39/16* (2013.01); *B01D 67/0088* (2013.01);
(Continued)

(58) Field of Classification Search
CPC .... B01D 39/16; B01D 67/0088; B01D 69/12; B01D 71/36; B01D 71/40; B01D 2325/36; B01D 2325/38; C08J 9/36; C09J 7/02
See application file for complete search history.

(56) References Cited

U.S. PATENT DOCUMENTS 5,462,586 A 10/1995 Sugiyama et al.
6,228,477 B1 * 5/2001 Klare et al. ................. 428/315.5
(Continued)

FOREIGN PATENT DOCUMENTS

| EP | 2 404 652 | 1/2012 |
|---|---|---|
| JP | 6-073229 | 3/1994 |

(Continued)

OTHER PUBLICATIONS

Machine Translation OSUGI JP 2011-115687 Jun. 16, 2011, 21 pages.*

(Continued)

*Primary Examiner* — Jason M Greene
*Assistant Examiner* — Anthony Shumate
(74) *Attorney, Agent, or Firm* — Hamre, Schumann, Mueller & Larson, P.C.

(57) ABSTRACT

Disclosed is an air-permeable filter with an adhesive layer. This air-permeable filter is imparted with oil repellency and includes: a porous membrane having a surface coated with an oil-repellent agent; and an adhesive layer disposed on the surface. The oil-repellent agent contains a linear fluorine-containing hydrocarbon group represented by (1) —$R^1C_5F_{10}CH_2C_4F_9$ or (2) —$R^2C_6F_{13}$, where $R^1$ and $R^2$ are each independently an alkylene group having 1 to 12 carbon atoms or a phenylene group. This air-permeable filter is imparted with oil repellency without significantly reducing its adhesive strength to the adhesive layer.

7 Claims, 1 Drawing Sheet

(51) Int. Cl.
*B01D 39/16* (2006.01)
*B01D 71/36* (2006.01)
*B01D 67/00* (2006.01)
*B01D 69/12* (2006.01)
*C08J 9/36* (2006.01)
*C09J 7/02* (2006.01)

(52) U.S. Cl.
CPC ............... *B01D 69/12* (2013.01); *B01D 71/36* (2013.01); *B01D 2325/36* (2013.01); *B01D 2325/38* (2013.01); *C08J 9/36* (2013.01); *C09J 7/02* (2013.01)

(56) References Cited

U.S. PATENT DOCUMENTS

| | | | |
|---|---|---|---|
| 6,723,147 B2* | 4/2004 | Mashiko et al. | 55/385.1 |
| 8,338,529 B2 | 12/2012 | Hoshino et al. | |
| 8,512,428 B2 | 8/2013 | Ueki et al. | |
| 2006/0029799 A1 | 2/2006 | Sebastian et al. | |
| 2009/0049988 A1 | 2/2009 | Meindl | |
| 2009/0084498 A1* | 4/2009 | Shimizu | 156/304.1 |
| 2010/0024898 A1 | 2/2010 | Bansal et al. | |
| 2013/0005928 A1* | 1/2013 | Hoshino et al. | 526/329.7 |
| 2013/0087042 A1 | 4/2013 | Furuyama et al. | |
| 2014/0023895 A1* | 1/2014 | Ikeyama et al. | 429/82 |
| 2015/0041127 A1* | 2/2015 | Kuki et al. | 166/266 |
| 2015/0082984 A1* | 3/2015 | Maruoka et al. | 96/13 |
| 2015/0089911 A1* | 4/2015 | Ikeyama | 55/524 |
| 2015/0165386 A1* | 6/2015 | Mori et al. | 55/524 |
| 2015/0166820 A1* | 6/2015 | Ikeyama et al. | 55/524 |

FOREIGN PATENT DOCUMENTS

| | | |
|---|---|---|
| JP | 7-126428 | 5/1995 |
| JP | 2005-253711 | 9/2005 |
| JP | 2010-000464 | 1/2010 |
| JP | 2011-115687 | 6/2011 |
| JP | 2012-011326 | 1/2012 |
| JP | 2012-020280 | 2/2012 |
| WO | 2008/087915 | 7/2008 |
| WO | WO 2009154307 A1 * | 12/2009 |
| WO | 2010/101091 | 9/2010 |
| WO | 2012/117709 | 9/2012 |

OTHER PUBLICATIONS

Extended European Search Report issued in European Patent Application No. 13773073.5, Oct. 29, 2015, 6 pages.

* cited by examiner

OIL REPELLENCY-IMPARTED AIR-PERMEABLE FILTER WITH ADHESIVE LAYER

TECHNICAL FIELD

The present invention relates to an oil repellency-imparted air-permeable filter with an adhesive layer.

BACKGROUND ART

Vent holes are often provided in housings of various devices including: automotive electrical/electronic components such as headlamps, rear lamps, fog lamps, turn lamps, motors, various pressure sensors, and pressure switches; cameras; videos; information terminals such as mobile phones; electric shavers; electric toothbrushes; and lamps for outdoor use. The main purpose of providing a vent hole in a housing of a device is to allow the interior of the device to communicate with the exterior thereof so as to avoid an excessive increase in the pressure inside the housing of the device associated with an increase in the temperature therein during operation of the device. A vent hole is also provided in a casing of a battery for the purpose of discharging a gas generated during operation of the battery.

In order to prevent entry of water or dust through a vent hole provided in a housing of a device, an air-permeable filter is placed over the vent hole in some cases. It is common practice to attach the above air-permeable filter to the housing of the device using an adhesive layer such as a pressure-sensitive adhesive tape because the use of the adhesive layer is an easy and reliable way to attach the filter to the housing at low cost.

A porous membrane made of a polyolefin resin or a fluorine resin is often used as the above air-permeable filter. In particular, a porous membrane obtained by stretching polytetrafluoroethylene (hereinafter referred to as "PTFE") to form a microporous structure therein (hereinafter referred to as a "stretched porous PTFE membrane") is known as an air-permeable filter excellent in water repellency. However, sebum, a surfactant, oil, or the like may contact an air-permeable filter depending on the environment in which the filter is used. Even if a stretched porous PTFE membrane excellent in water repellency is used as an air-permeable filter, entry of a liquid having a low surface tension cannot be fully prevented. Accordingly, depending on the intended use, an air-permeable filter is subjected to oil-repellent treatment using a treating agent containing a fluorine-containing polymer.

It is well known that a fluorine-containing polymer having a linear perfluoroalkyl group (hereinafter, a "linear perfluoroalkyl group" may be referred to as an "Rf group") having 8 or more carbon atoms is suitable for imparting oil repellency. Rf groups having 8 or more carbon atoms have a significantly higher crystallinity than Rf groups having a smaller number of (for example, 6 or less) carbon atoms. This high crystallinity is considered to contribute to the development of excellent oil repellency. It is also known that, due to its high crystallinity, a treating agent having an Rf group having 8 or more carbon atoms exhibits a large receding contact angle, (which is one of the dynamic contact angles and another of which is an advancing contact angle). The receding contact angle increases with increasing crystallinity, and sharply increases as the number of carbon atoms increases from 6 to 8. For these reasons, it is common practice to use a treating agent containing a fluorine-containing polymer having an Rf group having 8 or more carbon atoms to impart oil repellency to an air-permeable filter.

It is also known that oil repellency is imparted to an air-permeable filter using another treating agent together with the above-mentioned treating agent. For example, Patent Literature 1 discloses treating an air-permeable filter with a treating agent that contains a fluorine-containing polymer having an Rf group and that also contains a fluorine resin having a fluorine-containing alicyclic structure in its main chain (claim 1, etc.). The fluorine resin having a fluorine-containing alicyclic structure has excellent film formation properties, and can be obtained, for example, by polymerization of perfluoro(2,2-dimethyl-1,3-dioxole) (paragraphs [0009] and [0011]). Patent Literature 1 teaches that the number of carbon atoms in the perfluoroalkyl group is 4 to 16, and particularly preferably 6 to 12 (paragraph [0023]). However, in Examples, a fluorine-containing polymer having perfluoroalkyl groups having 9 carbon atoms on average is used according to the common practice described above (paragraphs [0049] and [0050]; and Examples).

CITATION LIST

Patent Literature

Patent Literature 1: JP H07(1995)-126428 A

SUMMARY OF INVENTION

Technical Problem

As described above, it has been conventionally thought that the use of the high crystallinity of an Rf group having 8 or more carbon atoms is essential to impart high oil repellency. For example, as indicated in the description of Examples in Patent Literature 1, sufficient oil repellency cannot be imparted to an air-permeable filter by using only a fluorine resin having a fluorine-containing alicyclic structure (Comparative Examples). Also from a practical point of view, even if an air-permeable filter has such a property of being "instantly wetted" by contact with toluene or IPA (isopropanol) used in the oil repellency test of Patent Literature 1, such oil repellency cannot be regarded as sufficient. The reality is that an Rf group having 8 or more carbon atoms is used in order to impart practically sufficient oil repellency to an air-permeable filter.

However, in some cases where an air-permeable filter is subjected to oil-repellent treatment with a treating agent containing a fluorine-containing polymer having an Rf group having 8 or more carbon atoms, the adhesive strength of an adhesive layer to the treated air-permeable filter decreases significantly. Presumably, the fluorine-containing functional group used in the oil-repellent treatment of the air-permeable filter is responsible for this decrease in the adhesive strength. In fact, fluorine-containing functional groups are less likely to interact with any material. Therefore, adhesive agents also are hardly wetted with the treating agent and thus cannot exhibit sufficient adhesive strength.

Recently, there has been a growing need for minimizing the width of the adhesive layer to be attached to the air-permeable filter so as to increase the effective area providing air permeability. As the width of the adhesive layer is reduced, the area of contact with the air-permeable filter also decreases, resulting in a decrease in the adhesive strength. Therefore, there is a great demand for novel air-permeable filters capable of maintaining the same level of adhesive strength as conventional air-permeable filters even if the area of contact with an adhesive layer is reduced as described above.

In view of the above circumstances, it is an object of the present invention to impart oil repellency to an air-permeable filter without reducing the adhesive strength between the air-permeable filter and an adhesive layer.

Solution to Problem

The present invention provides an air-permeable filter with an adhesive layer. This air-permeable filter is imparted with oil repellency and includes: a porous body having a surface coated with an oil-repellent agent; and an adhesive layer disposed on the surface. The oil-repellent agent contains a linear fluorine-containing hydrocarbon group represented by:
1) —$R^1C_5F_{10}CH_2C_4F_9$ or
2) —$R^2C_6F_{13}$,
where $R^1$ and $R^2$ are each independently an alkylene group having 1 to 12 carbon atoms or a phenylene group.

Advantageous Effects of Invention

The oil-repellent agent having a linear fluorine-containing hydrocarbon group represented by 1) or 2) can impart oil repellency enough to meet practical requirements, without significantly reducing the adhesive strength between the air-permeable filter and the adhesive layer.

DESCRIPTION OF EMBODIMENTS

Figure 1:
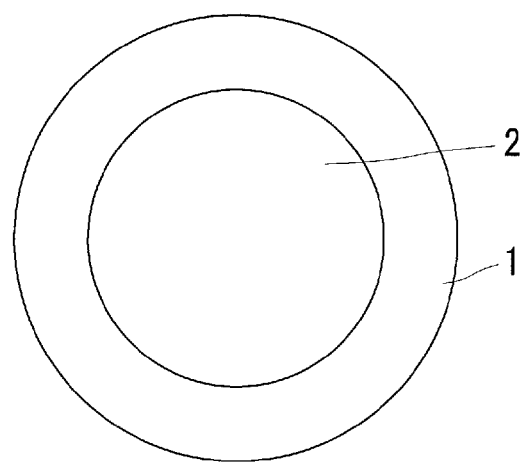
FIG. 1 is a top view of an embodiment of an air-permeable filter with an adhesive layer of the present invention.

An air-permeable filter with an adhesive layer according to the present invention includes a porous body having a surface coated with an oil-repellent agent. A porous membrane made of a fluorine resin, in particular, a stretched porous PTFE membrane, is suitable as the porous body. An example of a method for producing a stretched porous PTFE membrane will be described below, although a commercially available product may be used as the stretched porous PTFE membrane.

First, a pasty mixture obtained by adding a liquid lubricant to a PTFE fine powder is preformed. The liquid lubricant is not particularly limited, and may be any liquid lubricant that can wet the surface of the PTFE fine powder and that can be removed by extraction or drying. For example, hydrocarbon products such as liquid paraffin, naphtha, and white oil can be used. The appropriate amount of the liquid lubricant added is about 5 to 50 parts by weight per 100 parts by weight of the PTFE fine powder. The preforming may be performed at such a pressure that the liquid lubricant is not squeezed out.

Next, the preformed body is formed into a sheet by paste extrusion or rolling, and the formed body of PTFE is uniaxially or biaxially stretched to obtain a stretched porous PTFE membrane. The stretching of the formed body of PTFE is preferably carried out after the liquid lubricant is removed.

In the present description, as is conventional, a porous PTFE membrane obtained by stretching the formed sheet of PTFE to form a microporous structure therein is referred to as a "stretched porous PTFE membrane". The stretched porous PTFE membrane typically has a distinctive microporous structure composed of fibrils and nodes, and exhibits excellent water repellency by itself.

The stretched porous PTFE membrane may be a sintered product obtained by sintering the membrane at a temperature equal to or higher than the melting point of PTFE, or may be an unsintered product that has not undergone this sintering process.

The average pore diameter of the porous body is preferably 0.005 μm to 10 μm, more preferably 0.01 μm to 5 μm, and particularly preferably 0.1 μm to 3 μm. When the average pore diameter is too small, the air permeability of the air-permeable filter may decrease. When the average pore diameter is too large, foreign matters may leak. In addition, the thickness of the porous body is preferably 5 μm to 5000 μm, more preferably 10 μm to 1000 μm, and particularly preferably 10 μm to 500 μm. When the thickness is too small, there is a risk that the strength of the membrane is insufficient or the air-permeable filter is deformed too much due to a differential pressure between the interior and exterior of a vent housing. When the thickness is too large, the air permeability of the air-permeable filter may decrease.

The air-permeable filter may be a layered body including: a stretched porous PTFE membrane having a surface coated with an oil-repellent agent; and an air-permeable support for reinforcing the membrane. The use of the air-permeable support can prevent the deformation of the air-permeable filter due to a differential pressure. The air-permeable support may be a single-layer body or a layered body formed of two or more layers. In order for the filter to exhibit oil repellency, at least one principal surface of the air-permeable filter should be the surface of the stretched porous PTFE membrane that is coated with the oil-repellent agent.

As the air-permeable support, a porous ultra-high molecular weight polyethylene membrane, a nonwoven fabric, a woven fabric, a net, a mesh, a sponge, a foam, a porous metallic membrane, a metallic mesh, or the like, can be used. From the viewpoints of, for example, strength, elasticity, air permeability, workability, and weldability to containers, a nonwoven fabric or a porous ultra-high molecular weight polyethylene membrane is preferable as the air-permeable support.

The stretched porous PTFE membrane and the air-permeable support may be simply stacked together, may be bonded together using an adhesive, a hot-melt resin, or the like, or may be welded together by hot welding, ultrasonic welding, vibration welding, or the like.

In the present invention, an oil-repellent agent having a linear fluorine-containing hydrocarbon group represented by:
1) —$R^1C_5F_{10}CH_2C_4F_9$: or
2) —$R^2C_6F_{13}$
is used. Here, $R^1$ and $R^2$ are each independently an alkylene group having 1 to 12 carbon atoms or preferably 1 to 10 carbon atoms, or a phenylene group. The fluorine-containing hydrocarbon group represented by 1) or 2) is a linear fluoroalkyl group when $R^1$ or $R^2$ is an alkylene group. The term "linear" is intended to make it clear that the carbon skeleton of the fluorine-containing hydrocarbon group does not have two or more branched terminals, and is not intended to exclude the case where a phenylene group is contained as $R^1$ or $R^2$.

A linear perfluoroalkyl group (Rf group) is a functional group that has a $CF_3$ group exhibiting a low surface free energy and that imparts water/oil repellency to a coated surface. As described above, it is known that an Rf group having 8 or more carbon atoms has high crystallinity, and thus allows excellent oil repellency to develop. A treating agent containing a fluorine-containing polymer having an Rf group having 8 or more carbon atoms is suitable for imparting water/oil repellency to a substrate made of leather, paper, resin, or the like. However, when the treating agent is used for an air-permeable filter having a microporous structure, such as a stretched porous PTFE membrane, the adhesive strength to the adhesive layer that is a pressure-sensitive adhesive tape may decrease significantly. The water/oil repellency imparted by this treating agent is useful particularly for applications that require large dynamic contact angles. However, it is generally sufficient that oil repellency enough to block penetration of hydrocarbons such as toluene and decane and of lower alcohols as typified by IPA can be imparted to an air-permeable filter. When the oil-repellent agent having the linear fluorine-containing hydrocarbon group represented by 1) or 2) is used to coat the surface of the stretched porous PTFE membrane, practically sufficient oil repellency can be imparted to the resulting air-permeable filter without significantly reducing its adhesive strength to the adhesive layer.

The oil-repellent agent is preferably a fluorine-containing polymer having a linear fluorine-containing hydrocarbon group as a side chain. In this fluorine-containing polymer, for example, the linear fluorine-containing hydrocarbon group is bonded to the main chain directly or via a functional group such as an ester group or an ether group.

Examples of the fluorine-containing polymer having the linear fluorine-containing hydrocarbon group represented by 1) or 2) include a polymer formed from monomers at least a part of which is a compound represented by:
a) $CH_2=CR^3COOR^1C_5F_{10}CH_2C_4F_9$; or
b) $CH_2=CR^4COOR^2C_6F_{13}$.
Here, $R^1$ and $R^2$ are as described above. In addition, $R^3$ and $R^4$ are each independently a hydrogen atom or a methyl group.

In the case where high oil repellency is required, a compound represented by a), or a compound represented by b) where $R^4$ is a methyl group, is preferably selected as a part of monomers. That is, in a preferred embodiment of the present invention, a polymer formed from monomers represented by:
a) $CH_2=CR^3COOR^1C_5F_{10}CH_2C_4F_9$; or
b') $CH_2=C(CH_3)COOR^2C_6F_{13}$
is used. Also here, $R^1$, $R^2$, and $R^3$ are as described above.

From the viewpoints of preventing a decrease in the adhesive strength to the adhesive layer, the linear fluorine-containing hydrocarbon group represented by 2) is more suitable. Therefore, in the case where the maintenance of the adhesive strength to the adhesive layer is strongly required, it is preferable to select a compound represented by b) as a part of monomers for forming the fluorine-containing polymer.

This fluorine-containing polymer may be formed by polymerizing only the compound(s) represented by a) and/or b) as monomers, but may be formed by copolymerizing the compound(s) with other monomers. Examples of the other monomers for copolymerization include various (meth)acrylic monomers. However, the other monomers are not limited to (meth)acrylic monomers. Any of various monomers having ethylenically unsaturated bonds, such as tetrafluoroethylene, may be used. The copolymer may be a random copolymer or a block copolymer. When the fluorine-containing polymer is a copolymer, the ratio of the compound represented by a) or b) in all monomers is preferably 60 mol % or more, and particularly preferably 90 mol % or more in order not to affect imparting of oil repellency. The polymerization of the compound can be performed according to a commonly-known method for polymerizing acrylic monomers, and can be carried out by solution polymerization or emulsion polymerization.

The average molecular weight of the fluorine-containing polymer is not particularly limited, and is, for example, about 1000 to 500000 in terms of the number average molecular weight.

Examples of the method for coating the surface of the stretched porous PTFE membrane with the oil-repellent agent include a method in which the air-permeable filter is immersed into a solution prepared by dissolving the oil-repellent agent in a dissolving liquid, and a method in which the solution is applied or sprayed onto the air-permeable filter. When coating the stretched porous PTFE membrane with the oil-repellent agent, it is preferable to fix the edges of the stretched porous PTFE membrane by a frame or the like in order to prevent contraction of the stretched porous PTFE membrane. The appropriate concentration of the oil-repellent agent in the solution varies depending on the method for coating, and is about 0.1% by weight to 10% by weight in the case of the method in which the air-permeable filter is immersed into the solution.

It is determined that the surface of the air-permeable filter has practical oil repellency when a 5 mm-diameter droplet of an organic solvent that is n-decane or methanol does not penetrate the surface within 30 seconds after the droplet is applied onto the surface. The present invention can also provide an air-permeable filter with an adhesive layer that includes a stretched porous PTFE membrane having a thickness of 0.01 mm or more or even 0.05 mm or more in order to achieve the strength required for the air-permeable filter, and that also has high adhesive strength as described above and has a surface having practical oil repellency.

The use of a stretched porous PTFE membrane as an example of the porous body has been described above, but the porous body of the present invention is not limited only to the stretched porous PTFE membrane. A porous formed body composed of fine ultra-high molecular weight polyethylene fine particles that are bound together (porous body of ultra-high molecular weight polyethylene) or an air-permeable sheet obtained by forming a plurality of through holes in a non-porous resin sheet in its thickness direction may be used.

Figure 2:
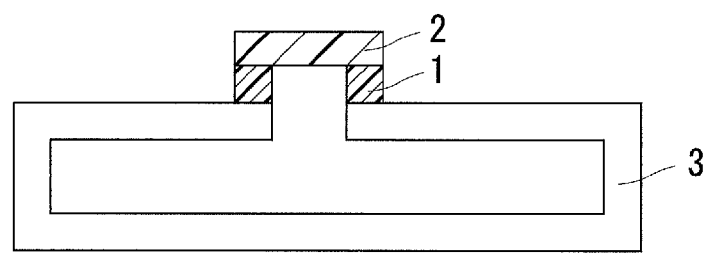
FIG. 2 is a cross-sectional view of the embodiment of the air-permeable filter with an adhesive layer of the present invention, which is attached to a housing of a device.

The air-permeable filter with an adhesive layer of the present invention is characterized in that it includes an adhesive layer 1 in contact with a part of the surface of the filter, as shown in FIG. 1. In the embodiment shown in FIG. 1, the adhesive layer 1 has a ring shape having an outer edge extending along the outer edge of an air-permeable filter 2 and an inner edge surrounding the air-permeable region of the air-permeable filter 2. The air-permeable filter 2 is also present immediately below the adhesive layer 1, although not shown in FIG. 1. The adhesive layer 1 is pressed against a housing of a device so as to attach the air-permeable filter 2 with the adhesive layer to the housing of the device. FIG. 2 shows an example of the embodiment in which the air-permeable filter with the adhesive layer is attached to the housing of the device. Typically, the adhesive layer 1 is pressed against the vent hole of a device housing 3 so as to attach the air-permeable filter 2 to the housing, as shown in FIG. 2. In the present invention, the "adhesive layer" refers to any layer having adhesive properties and disposed in contact with the air-permeable filter, and is not necessarily limited only to a layer made of a pressure-sensitive adhesive agent. For example, the adhesive layer may be made of an adhesive. The adhesive layer may also be formed of a double-sided pressure-sensitive adhesive tape.

The adhesive layer is characterized in that it is disposed on the surface of the air-permeable filter, and preferably it is disposed in contact with the peripheral portion of the air-permeable filter. This is the preferred location of the adhesive layer for the intended use of the air-permeable filter to prevent entry of water or dust through a vent hole while maintaining the ventilation through the vent hole. As used herein, the "peripheral portion of the air-permeable filter" refers to a region having a predetermined width extending radially inwardly from the outer edge of the air-permeable filter toward the center thereof. For example, in the case where the air-permeable filter has a circular shape as shown in FIG. 1, the peripheral portion of the air-permeable filter is a doughnut-shaped region on which the adhesive layer 1 is disposed. The peripheral portion shown in FIG. 1 has a constant width, but the width of the peripheral portion does not necessarily have to be constant and may vary from place to place.

Figure 3:
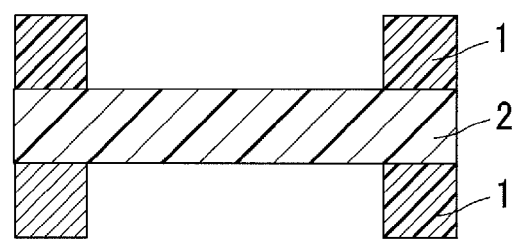
FIG. 3 is a cross-sectional view of another embodiment of the air-permeable filter with an adhesive layer of the present invention.

As shown in FIG. 3, the air-permeable filter 2 may further include an adhesive layer 1 disposed on the surface opposite to the front surface. The air-permeable filter 2 having the adhesive layers 1 thus disposed in contact with both the front and back surfaces thereof is remarkably easy to use, for example, when it is disposed in a connecting portion between members.

When the adhesive strength of the oil repellent-treated air-permeable filter is too low, the air-permeable filter is easily removed from the housing of the device, thus causing entry of water or dust into the housing of the device through the vent hole. Therefore, the adhesive strength between the adhesive sheet and the air-permeable filter is preferably 3.0 N or more per 5 mm diameter and more preferably 3.5 N or more per 5 mm diameter when the adhesive strength is evaluated by a probe tack test. As shown in Examples described below, the present invention can provide an air-permeable filter that has an adhesive strength of 3.0 N or more per 5 mm diameter and that includes a surface having practical oil repellency. In the probe tack test, a probe with an adhesive sheet attached to its tip is pressed against an air-permeable filter, and the force required to remove the probe from the air-permeable filter is measured as the adhesive strength. Therefore, the adhesive strength can be evaluated over the entire adhesive surface, and thus the probe tack test can be considered as a test method by which the adhesive strength can be evaluated quantitatively.

EXAMPLES

Hereinafter, the present invention will be described in detail with reference to Examples and Comparative Example. However, the present invention is not limited to these Examples.

Example 1

As a stretched porous PTFE membrane, "TEMISH (registered trademark) NTF 1131" (size: 15 cm×15 cm; thickness: 0.1 mm; average pore diameter: 1 µm) manufactured by Nitto Denko Corporation was prepared. In addition, an oil-repellent treatment liquid was prepared by diluting an oil-repellent agent "X-70-042" manufactured by Shin-Etsu Chemical Co., Ltd., with a diluting agent ("FS thinner" manufactured by Shin-Etsu Chemical Co., Ltd.) so that the concentration of the oil-repellent agent was 3.0% by weight. The "X-70-042" is an oil-repellent agent that includes, as an oil-repellent component, a polymer formed from monomers including a compound having a linear fluoroalkyl group and represented by the following formula (a-1):

$$CH_2=C(CH_3)COOCH_2CH_2C_5F_{10}CH_2C_4F_9 \qquad (a\text{-}1)$$

The air-permeable filter was immersed for about 3 seconds in the oil-repellent treatment liquid whose temperature was maintained at 20° C. Subsequently, the air-permeable filter was left at ordinary temperature for about 1 hour to dry the filter. Thus, an oil-repellent, air-permeable filter was obtained. The air-permeable filter with an adhesive layer of the present invention can be obtained by providing an adhesive layer on this air-permeable filter, but the air-permeable filter without an adhesive layer was used to smoothly perform the oil repellency test to be described later.

Example 2

An air-permeable filter was obtained in the same manner as in Example 1, except that an oil-repellent agent "X-70-041" manufactured by Shin-Etsu Chemical Co., Ltd., was used. The "X-70-041" is an oil-repellent agent that includes, as an oil-repellent component, a polymer formed from monomers including a compound having a linear fluoroalkyl group and represented by the following formula (a-2):

$$CH_2=CHCOOCH_2CH_2C_5F_{10}CH_2C_4F_9 \qquad (a\text{-}2)$$

Example 3

100 g of a compound having a linear fluoroalkyl group and represented by the formula (b-1) shown below, 0.1 g of azobisisobutyronitrile serving as a polymerization initiator, and 300 g of a solvent ("FS thinner" manufactured by Shin-Etsu Chemical Co., Ltd.) were put into a flask equipped with a nitrogen introducing tube, a thermometer, and a stirrer. Nitrogen gas was introduced while stirring was performed at 70° C., and addition polymerization was thus allowed to proceed for 16 hours. As a result, 80 g of a fluorine-containing polymer was obtained. The number average molecular weight of this polymer was 100000. An oil-repellent treatment liquid was prepared by diluting the fluorine-containing polymer with a diluting agent ("FS thinner" manufactured by Shin-Etsu Chemical Co., Ltd.) so that the concentration of the fluorine-containing polymer was 3.0% by weight.

$$CH_2=C(CH_3)COOCH_2CH_2C_6F_{13} \qquad (b\text{-}1)$$

An air-permeable filter was obtained in the same manner as in Example 1, except that the oil-repellent treatment liquid mentioned above was used.

Example 4

100 g of a compound having a linear fluoroalkyl group and represented by the formula (b-2) shown below, 0.1 g of azobisisobutyronitrile serving as a polymerization initiator, and 300 g of a solvent ("FS thinner" manufactured by Shin-Etsu Chemical Co., Ltd.) were put into a flask equipped with a nitrogen introducing tube, a thermometer, and a stirrer. Nitrogen gas was introduced while stirring was performed at 70° C., and addition polymerization was thus allowed to proceed for 16 hours. As a result, 80 g of a fluorine-containing polymer was obtained. The number average molecular weight of this polymer was 100000. An oil-repellent treatment liquid was prepared by diluting the fluorine-containing polymer with a diluting agent ("FS thinner" manufactured by Shin-Etsu Chemical Co., Ltd.) so that the concentration of the fluorine-containing polymer was 3.0% by weight.

$$CH_2=CHCOOCH_2CH_2C_6F_{13} \qquad (b\text{-}2)$$

An air-permeable filter was obtained in the same manner as in Example 1, except that the oil-repellent treatment liquid mentioned above was used.

Comparative Example 1

100 g of a compound having a linear fluoroalkyl group and represented by the formula (c) shown below, 0.1 g of azobisisobutyronitrile serving as a polymerization initiator, and 300 g of a solvent ("FS thinner" manufactured by Shin-Etsu Chemical Co., Ltd.) were put into a flask equipped with a nitrogen introducing tube, a thermometer, and a stirrer. Nitrogen gas was introduced while stirring was performed at 70° C., and addition polymerization was thus allowed to proceed for 16 hours. As a result, 80 g of a fluorine-containing polymer was obtained. The number average molecular weight of this polymer was 100000. An oil-repellent treatment liquid was prepared by diluting the fluorine-containing polymer with a diluting agent ("FS thinner" manufactured by Shin-Etsu Chemical Co., Ltd.) so that the concentration of the fluorine-containing polymer was 3.0% by weight.

$$CH_2=C(CH_3)COOCH_2CH_2C_8F_{17} \quad (c)$$

An air-permeable filter was obtained in the same manner as in Example 1, except that the oil-repellent treatment liquid mentioned above was used.

<Evaluation>

Oil repellency test, water entry pressure peel test, and adhesion test were carried out for the air-permeable filters having been subjected to oil-repellent treatment in Examples and Comparative Example 1, and for an air-permeable filter not having been subjected to oil-repellent treatment (that is, an untreated product of TEMISH (registered trademark) NTF 1131).

(Oil Repellency Test)

The oil repellency test was carried out in accordance with "textiles-oil repellency-hydrocarbon resistance test" specified in ISO 14419. Specifically, a droplet of an organic solvent having a diameter of about 5 mm was applied onto a surface of each air-permeable filter using a pipette, and whether or not penetration of the droplet occurred within 30 seconds after application of the droplet was visually observed. As the organic solvents, n-decane, methanol, and n-hexane were used. For the penetration of the droplet, it was determined that "penetration occurred" when the droplet was absorbed into the air-permeable filter or when the color of the air-permeable filter changed due to the penetration of the droplet. Table 1 shows the evaluation results.

(Water Entry Pressure Peel Test)

The water entry pressure peel test was carried out in accordance with "water resistance tester (high water pressure method)" specified in JIS L 1092.

First, a circular hole with a diameter of 6 mm was formed in a double-sided pressure-sensitive adhesive tape (product name: No. 5000NS) manufactured by Nitto Denko Corporation. Next, each of the air-permeable filters of Examples and Comparative Example 1 was attached to the double-sided pressure-sensitive adhesive tape and punched into a circular shape with a diameter of 9 mm. The positions of the air-permeable filter and the adhesive tape were adjusted so that the center of the 9-mm diameter circle coincided with the center of the 6-mm diameter circle. Thus, a disc-shaped (doughnut-shaped) specimen with an outer diameter of 9 mm and an inner diameter of 6 mm was obtained. Subsequently, the other surface of the double-sided pressure-sensitive adhesive tape of this specimen was attached to a SUS plate of the water resistance tester. This SUS plate has a 5-mm diameter hole formed therein and is configured to allow water to reach a specimen through the hole and to apply pressure to the specimen. The water pressure applied to the specimen was increased at a pressure increase rate of 100 kPa/min until the air-permeable filter and the double-sided pressure-sensitive adhesive tape were separated from each other and water entered the filter, and the water pressure at that time was measured with a manometer to obtain a water entry pressure. Table 1 shows the evaluation results.

(Adhesion Test)

The adhesive strength between the oil-repellent-treated surface of the air-permeable filter and the pressure-sensitive adhesive agent was evaluated by the probe tack test. A tacking tester "TACKING TESTER" manufactured by RHESCA Corporation was used for the probe tack test. Specifically, first, a probe with a diameter of 5 mm was set on the tacking tester. Next, the same double-sided pressure-sensitive adhesive tape ("No. 5000NS" manufactured by Nitto Denko Corporation) as mentioned above was punched into a circular sheet with a diameter of 5 mm and attached to the tip of the probe of the tacking tester. Next, the probe was brought into contact with the oil-repellent-treated surface of each of the air-permeable filters of Examples and Comparative Example 1 at a rate of 120 mm/min, allowed to press the air-permeable filter with a force of 1N for one second, and then removed from the filter. The force (N) required to remove the probe was used to evaluate the adhesive strength between the air-permeable filter and the double-sided pressure-sensitive adhesive sheet. This measurement was carried out in an environment at 23° C. and 65% RH. Table 1 shows the evaluation results.

TABLE 1

|  | Oil repellency test | | | Water entry pressure (kPa) | Probe tack (N per 5 mm diameter) |
| --- | --- | --- | --- | --- | --- |
|  | n-decane | methanol | n-hexane | | |
| Untreated product | x | x | x | 290 | 5.5 |
| Example 1 | ○ | ○ | ○ | 140 | 3.6 |
| Example 2 | ○ | ○ | ○ | 130 | 3.5 |
| Example 3 | ○ | ○ | ○ | 200 | 4.8 |
| Example 4 | ○ | ○ | x | 270 | 5.0 |
| Com. Example 1 | ○ | ○ | ○ | 100 | 2.5 |

○: Penetration did not occur
x: Penetration occurred

The results of the "water/oil repellency test" in Table 1 reveals that the air-permeable filters of Examples 1 to 4 each have oil repellency enough to block penetration of n-decane (surface tension: 23.83 dyn·cm$^{-1}$) and methanol (surface tension: 22.45 dyn·cm$^{-1}$). It can be said that the levels of the oil repellency of Examples 1 to 4 are quite comparable to that of Comparative Example 1. Such a surface that blocks penetration of these organic solvents can meet practical requirements for the properties needed for use as an air-permeable filter. The air-permeable filters of Examples 1 to 3 also have high oil repellency enough to block penetration of n-hexane (surface tension: 18.40 dyn·cm$^{-1}$). In the applications that require high oil repellency, it is preferable to use monomers represented by $CH_2=CR^3COOR^1C_5F_{10}CH_2C_4F_9$ or $CH_2=C(CH_3)COOR^2C_6F_{13}$.

A comparison of the evaluation results of the "water entry pressure" and the "probe tack" between Examples 1 and 2 and Examples 3 and 4 shows that the polymers (of Examples 3 and 4) each containing monomers represented by $CH_2=CR^4COOR^2C_6F_{13}$ exhibit higher adhesive strength to the adhesive sheet. However, even the polymers (of Examples 1 and 2) containing monomers represented by $CH_2=CR^3COOR^1C_5F_{10}CH_2C_4F_9$ exhibit higher adhesive strength to the adhesive sheet than the polymer (of Comparative Example 1) containing a linear perfluoroalkyl group (Rf group) having 6 or more carbon atoms.

The above results are summarized as follows. The air-permeable filters of the present invention (Examples 1 to 4) have oil repellency enough to meet practical requirements, without significantly reducing their adhesive strength to the adhesive sheet. Thus, the effect of the present invention was confirmed.

The invention claimed is:

1. An air-permeable filter with an adhesive layer, the filter being imparted with oil repellency and comprising: a porous membrane having a surface coated with an oil-repellent agent; and the adhesive layer disposed on the surface, wherein
the oil-repellent agent comprises a linear fluorine-containing hydrocarbon group represented by $-R^1C_5F_{10}CH_2C_4F_9$, where $R^1$ is an alkylene group having 1 to 12 carbon atoms or a phenylene group.

2. The air-permeable filter with an adhesive layer according to claim 1, wherein the oil-repellent agent is a polymer formed from monomers at least a part of which is a compound represented by:

$$CH_2=CR^3COOR^1C_5F_{10}CH_2C_4F_9;\ or$$

where $R^3$ is a hydrogen atom or a methyl group.

3. The air-permeable filter with an adhesive layer according to claim 2, wherein the oil-repellent agent is a polymer formed from monomers represented by:

$$CH_2=CR^3COOR^1C_5F_{10}CH_2C_4F_9.$$

4. The air-permeable filter with an adhesive layer according to claim 1, further comprising a second adhesive layer disposed on a second surface opposite to the surface.

5. The air-permeable filter with an adhesive layer according to claim 1, wherein a 5 mm-diameter droplet of an organic solvent that is n-decane does not penetrate the surface within 30 seconds after the droplet is applied onto the surface.

6. The air-permeable filter with an adhesive layer according to claim 1, wherein an adhesive strength between the air-permeable filter and the adhesive layer is 3.0 N or more per 5 mm diameter when the adhesive strength is evaluated by a probe tack test.

7. The air-permeable filter with an adhesive layer according to claim 1, wherein the porous membrane is a stretched porous polytetrafluoroethylene membrane.

* * * * *